United States Patent [19]

Watts

[11] Patent Number: 5,242,131

[45] Date of Patent: Sep. 7, 1993

[54] STEERABLE LANDING GEAR

[75] Inventor: John Watts, Redmond, Wash.

[73] Assignee: The Boeing Company, Seattle, Wash.

[21] Appl. No.: 865,066

[22] Filed: Apr. 8, 1992

[51] Int. Cl.⁵ .................... B64C 25/50; B62D 5/06
[52] U.S. Cl. .................... 244/103 W; 244/50; 180/152; 280/97
[58] Field of Search ............ 244/50, 102 R, 103 W, 244/103 R; 180/152, 140; 280/97, 81.5

[56] References Cited

U.S. PATENT DOCUMENTS

| | | | |
|---|---|---|---|
| 2,538,388 | 1/1951 | Sievers | 244/50 |
| 2,630,285 | 3/1953 | Geisse | 244/103 W |
| 2,652,215 | 9/1953 | Brukner | 244/50 |
| 2,851,231 | 9/1958 | Westcott, Jr. | 244/102 R |
| 2,856,138 | 10/1958 | Hogan | 180/152 |
| 2,930,547 | 3/1960 | Hogan | 244/50 |
| 2,943,818 | 7/1960 | Camino et al. | 244/50 |
| 2,943,820 | 7/1960 | Westcott, Jr. | 244/50 |
| 3,285,541 | 11/1966 | Fehring et al. | 244/50 |
| 3,488,020 | 1/1970 | Scherer | 244/50 |
| 3,516,625 | 6/1970 | Houser et al. | 244/50 |
| 4,044,854 | 8/1977 | Schmitt | 280/81.5 |
| 4,948,069 | 8/1990 | Veaux et al. | 244/50 |
| 5,088,570 | 2/1992 | Loeber | 280/81.5 |

FOREIGN PATENT DOCUMENTS 535098 9/1941 United Kingdom .
630183 10/1949 United Kingdom ......... 244/103 W Primary Examiner—Michael S. Huppert
Assistant Examiner—Virna Lissi Ansley
Attorney, Agent, or Firm—Dellett and Walters

[57] ABSTRACT

A six wheel, three axle, bogie type main landing gear for an airplane is retractable as a unit and is provided with a rearward set of wheels or a forward set of wheels that is steerable with respect to the non-rotatable bogie beam. The set of wheels turns in response to steering of the nose wheel past a given angle. A wheel assembly is mounted for rotation with respect to a vertical shaft supported by a fork extending longitudinally of the beam, and a pair of hydraulic cylinders turns the wheel axles with respect to the beam.

14 Claims, 4 Drawing Sheets

STEERABLE LANDING GEAR

The present invention relates to multi-wheel landing gear for large aircraft and particularly to a landing gear truck or bogie having steerable wheels.

BACKGROUND OF THE INVENTION

Large aircraft, for example of the wide-body variety, typically employ multi-wheel landing gear or landing gear trucks which may be steerable to some degree when the aircraft is taxiing on the ground. The aircraft is usually provided with a steerable nose wheel or nose wheel landing gear and a plurality of main landing gear trucks adapted to cooperate with the nose wheel landing gear in executing a turn.

In a simplest case, the main landing gear comprises a pair of wheels mounted one at either side of the fuselage and rearward of the nose wheel. In this instance, when the nose wheel landing gear is steered, the rearward wheels merely follow as the aircraft turns about a point where the nose wheel transverse axis and the main wheel transverse axis intersect. For larger aircraft, individual wheels are replaced by trucks of wheels, for example comprising four wheels each. When the two main wheels are replaced with a pair of four wheel trucks, little difficulty is encountered and the trucks need not rotate about the axis of the supporting strut. However, for larger aircraft a greater number of weight bearing support wheels is required and a total of four trucks, two on each side of the aircraft, has typically been employed. In this case, two forward four wheel trucks are desirably non-steerable and substantially track the nose wheel landing gear in a turn wherein the transverse axis of the nose wheel and the central transverse axes of the two forward trucks coincide at a point about which turning takes place. However, the addition of "staggered" trucks, rearward on the aircraft from those already discussed, will bring about tire scrubbing as a turn is executed about the aforementioned point unless additional measures are taken. Therefore, the rearward trucks are steered to achieve a condition where their transverse axes also intersect the aforementioned turning point. The function of the forward and rearward trucks may be interchanged so that the forward pair of trucks is steered while the rearward trucks are stationary. As will be understood by those skilled in the art, the difference between the two situations determines the direction of steering of the trucks.

An intermediate situation relates to an aircraft having a steerable nose landing gear and a pair of six wheel trucks disposed rearwardly of the nose landing gear. In this case, the truck wheels of the main landing gear are far enough away from one another, i.e., on three separate axles, so that, unlike four wheel fixed trucks, unsatisfactory tire scrubbing occurs wherein the forward or rearward wheels tend to drag around a turn. Attempting to steer this large a truck about its support strut would serve little purpose.

SUMMARY OF THE INVENTION

In accordance with the present invention in a preferred embodiment thereof, a landing gear system comprises a steerable nose landing gear and a pair of main landing gear trucks or bogies disposed rearwardly of the nose landing gear at either side of the fuselage or under the wings. Each truck or bogie comprises a plurality of weight bearing support wheels, typically six wheels including pairs mounted in alignment on a bogie beam disposed parallel to the longitudinal axis of the airplane. The central pair of wheels is non-steerable and located immediately under a retractable strut that raises and lowers the bogie beam. A forward pair of wheels is mounted at the forward end of the beam and a rearward pair of wheels is mounted at the rear end of the beam. In accordance with the present invention, one of the rearward and forward pairs of wheels is steerable with respect to the bogie beam, i.e., such pair is mounted on the beam for rotation as a unit about a vertical axis or bearing on the retractable beam, while the remaining wheels are stationary with respect to the beam. In accordance with the preferred embodiment, the rearward wheels are steerable and the transverse axis of the rear wheels on the truck or bogie is turned so that it intersects the transverse axis of the nose landing gear, as well as the average transverse axis of the forward two pair of wheels on each truck, at the same point. The rearward wheels are turned in a direction opposite to the turning direction of the nose landing gear.

In the case where the forward pair of wheels of each truck is turned while the remaining wheels on each truck are aligned with the bogie beam, the forward pairs of wheels are turned in the same direction as the nose wheel landing gear. In some limited situations, both forward and rearward pairs of wheels may be turned with only the central pair of wheels on each truck remaining non-steerable. It is found that steering a pair of wheels on each truck or bogie of the main landing gear substantially reduces scrubbing while enabling sharp turning when taxiing the aircraft. The use of larger multi-wheeled trucks, adequate for bearing the weight without the necessity of employing additional trucks or wheels, is facilitated.

It is accordingly an object of the present invention to provide improved main landing gear systems for large aircraft.

It is a further object of the present invention to provide an improved main landing gear for large aircraft wherein the landing gear is capable of carrying heavy loads without the drawback of excessive tire scrubbing.

It is another object of the present invention to provide an improved aircraft main landing gear having steerable wheels.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

DETAILED DESCRIPTION

Figure 1:
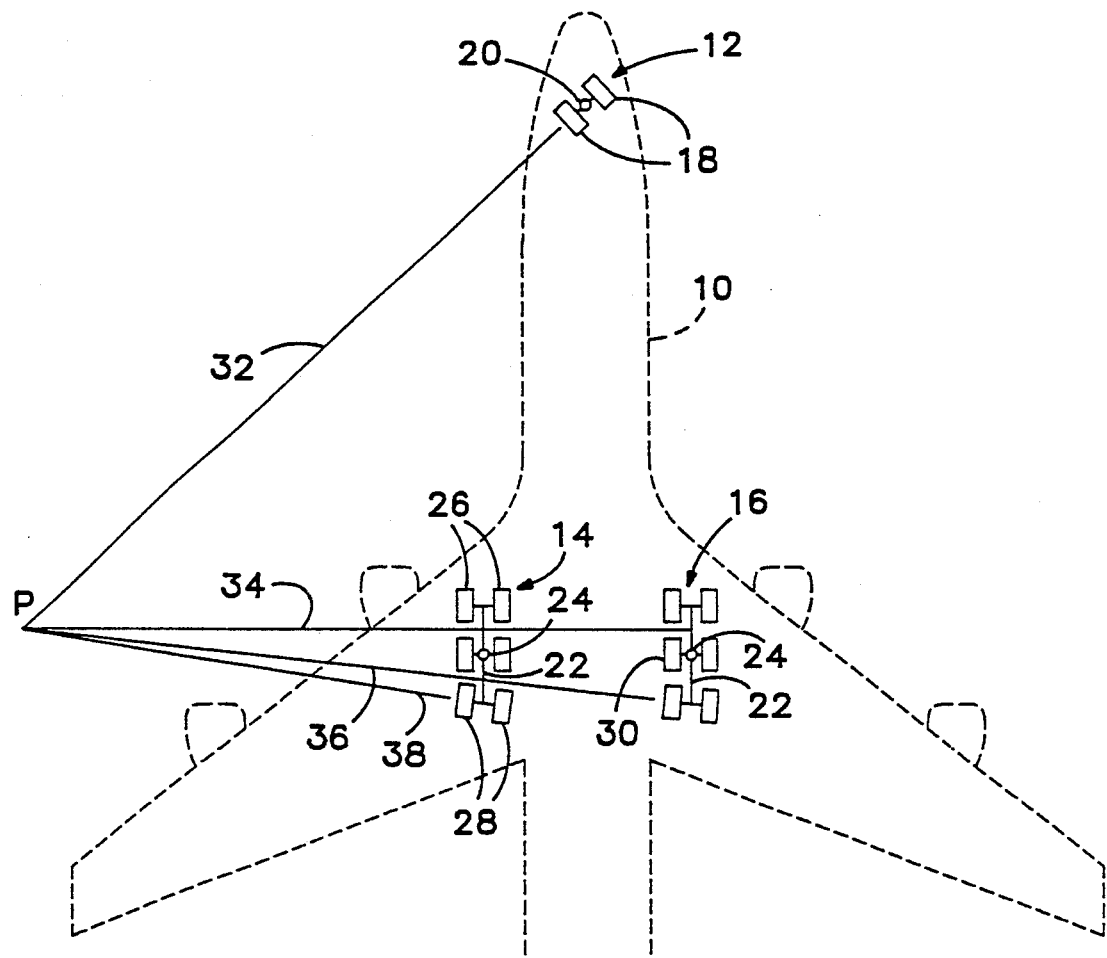
FIG. 1 is a schematic plan view of a large aircraft illustrating the steering pattern for landing gear trucks in accordance with the present invention.
Figure 2:
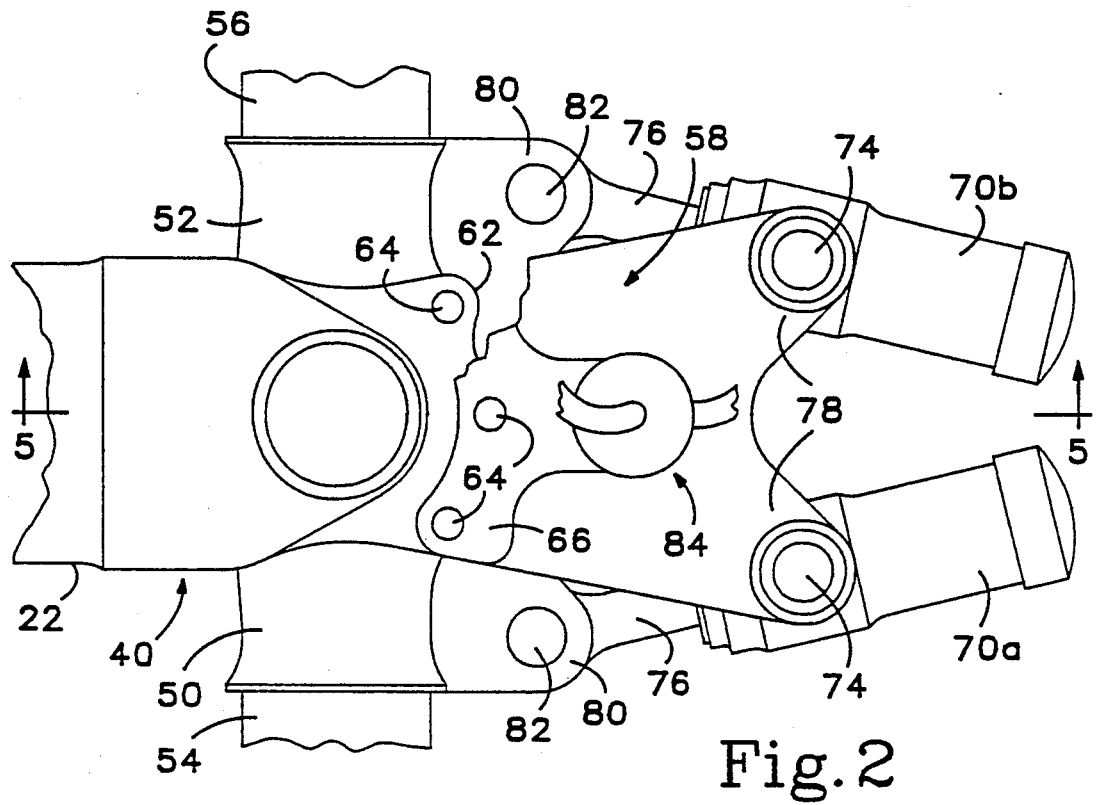
FIG. 2 is a partially broken away plan view of one end of a landing gear truck according to the present invention illustrating mounting means for a steerable pair of wheels.

Referring to FIG. 1, a phantom outline of an airplane 10 is illustrated which is provided therebelow with a nose wheel landing gear 12 and a main landing gear comprising trucks or bogies 14 and 16 disposed at either side of the airplane body. The nose wheel landing gear comprises a pair of wheels 18 that are steerable as a unit about shock strut 20 in response to pilot controls. The trucks or bogies 14 and 16 each comprise an elongated bogie beam 22 extending parallel to the longitudinal axis of the airplane and positionable below the body of the airplane on a retractable strut 24 in the manner understood by those skilled in the art.

Each truck or bogie is provided with a plurality of support wheels mounted on the bogie beam including a first pair 26 coaxial with one another and located forwardly on the beam, e.g. at the forward end of the beam, and a second pair of wheels 28 coaxial with one another and located rearwardly on the beam 22, e.g. at the rearward end thereof. A third pair of wheels 30 comprises a central pair also coaxial with one another and mounted on beam 22 between the first pair and the second pair, i.e., immediately below strut 24 on a fixed axle extending in a direction transverse to beam 22 and centrally supported by the bogie beam.

Thus, each of the trucks 14 and 16 comprises a six wheel, three axle, bogie-type main landing gear in the illustrated example. Although four wheel trucks could have been employed for this purpose, and a larger number of trucks in staggered array is frequently employed wherein one or more complete trucks are steered with respect to their support struts, six wheel trucks are preferred in many situations especially in the case of airplanes of intermediate size. A smaller number of trucks also requires less retracting mechanism.

It is not uncommon for an airplane to be required to make sharp turns when taxiing, for example sharp turns on runways less than 100 feet wide. In such case, several of the wheels on a six wheel bogie-type main landing gear of the type suggested by the prior art are apt to drag, scrubbing the tires and causing excessive wear. Moreover, additional engine thrust and therefore fuel waste as well as excessive engine noise may be caused by forcing a turn.

In accordance with the present invention, one pair of wheels on the truck, either the pair forwardly on the truck (26) or rearwardly on the truck (28) is steerable with respect to the truck. Thus, the beam 22 is provided with means for mounting a steerable pair of wheels for rotation as a unit about a vertical axis fixed with respect to retractable beam 22. The beam itself is non-rotatable with respect to the axis of the strut and therefore requires less mechanism. While either the forward pair of wheels 26 or the rearward pair of wheels 28 can be selected for steering in accordance with the present invention (or both pairs may be steered in certain instances), it is preferred that the rearward pair of wheels 28 be steerable while the remaining pairs 24 and 26 remain fixed, i.e., to track in a direction longitudinal of the airplane. One reason for the preference in steering the rear wheels relates to moving the turning point forward for enhanced stability. Also the engine thrust necessary is reduced.

The turning point P, or the point about which the airplane rotates in executing a turn, is the common center of turning radii for the nose wheel landing gear 12 and the average turning radii for the remaining four wheel portions of the main landing gear. Radius 32 is coincident with the transverse axis of nose wheel landing gear 12 when the nose landing gear is turned to the left to the extent illustrated. Radii 34 for the front four wheels of truck 14 and the front four wheels of truck 16 are coincident and define point P where intersecting radius 32. The center point of each of these sets of four wheels can be used as the point from which to draw the radii, the front four wheels on each truck functioning in the same manner as a prior art, fixed four wheel truck. However, radii 36 and 38 which are extended transverse axes from the rear pair of wheels on each truck are caused to intersect point P by turning the rear pair of wheels 28 on each truck. It will be observed that rear wheels 28 on truck 14 closer to point P are turned slightly more sharply than the rear wheels 28 on truck 16. It should also be noted the rear wheels 28 are turned in an opposite direction from the direction the nose landing gear is turned, that is, when the nose landing gear 12 is turned to the left as illustrated, the rear pair of wheels 28 on each main landing gear truck is turned to the right for facilitating the turn about point P as established by radii 32 and 34.

In the alternative instance wherein front pairs of wheels 26 are turned rather than pairs 28, a similar construction is employed to establish the common center of turning radii P and the extent to which the forward pairs of wheels 26 need to be steered to alleviate scrubbing of the tires. However, in such instance it will be seen the forward wheels 26 will be steered in the same direction as the nose wheel landing gear 12. Thus, if the nose wheel landing gear 12 is turned to the left as shown in FIG. 1, the forward pair of wheels 26 for each truck is also turned to the left while the central and rearward wheels are aligned to track straight ahead or in a direction parallel to the longitudinal axis of the airplane.

In either the case of the steerable rear wheels 28 or steerable forward wheels 26, these main landing gear wheels are controlled by suitable pilot operation controls coordinated with the nose wheel landing gear 12. In general, the steering of the pair of main landing gear wheels selected does not commence until the nose wheel landing gear 12 turns to the left or right by more than a given angle, for example twenty degrees. Then, the turning of the selected pairs of main landing gear wheels is designed to be proportional to the extent of turning by the nose landing gear. The control that may be employed is typically of the type disclosed in U.S. Pat. No. 3,516,625.

As indicated, it is possible to turn both the rear set of wheels and forward set of wheels simultaneously, for example for executing sharp "pirouette" type turns. However, in most cases steering of only one pair of wheels per landing gear truck is sufficient.

FIGS. 2–6 are partially broken-away views of one end of a landing gear truck according to the present invention showing mounting means for a steerable pair of wheels. The discussion will describe the mounting means for a rear pair of wheels i.e., 28 in FIG. 1, although the same discussion is in general applicable if the steerable pair were forward wheels numbered 26 in FIG. 1.

The mounting means in the illustrated example is disposed at the rearward end of bogie beam 22 and comprises a forked portion 40 forming an integral part of the beam and extending longitudinally therefrom, i.e., rearwardly. The forked portion 40 comprises an upper member 42 and a lower member 44 providing secure support for a vertical shaft or post 46 of substantial size about which a hub 48 turns, the hub 48 extending substantially between member 42 and member 44. The hub is accurately positioned vertically in bearing relation with vertical shaft 46 for rotation with respect thereto while bearing members are further provided at the upper and lower ends of the hub.

Hub 48 carries axle members 54 and 56 upon which rubber tired wheels are mounted, e.g. wheels 28 in FIG. 1. Axle members 54 and 56 are securely mounted to hub arms 50 and 52 integral with hub 48 and extend transversely outwardly therefrom so as to position the pair of wheels in coaxial relation with one another at the desired separation.

Figure 3:
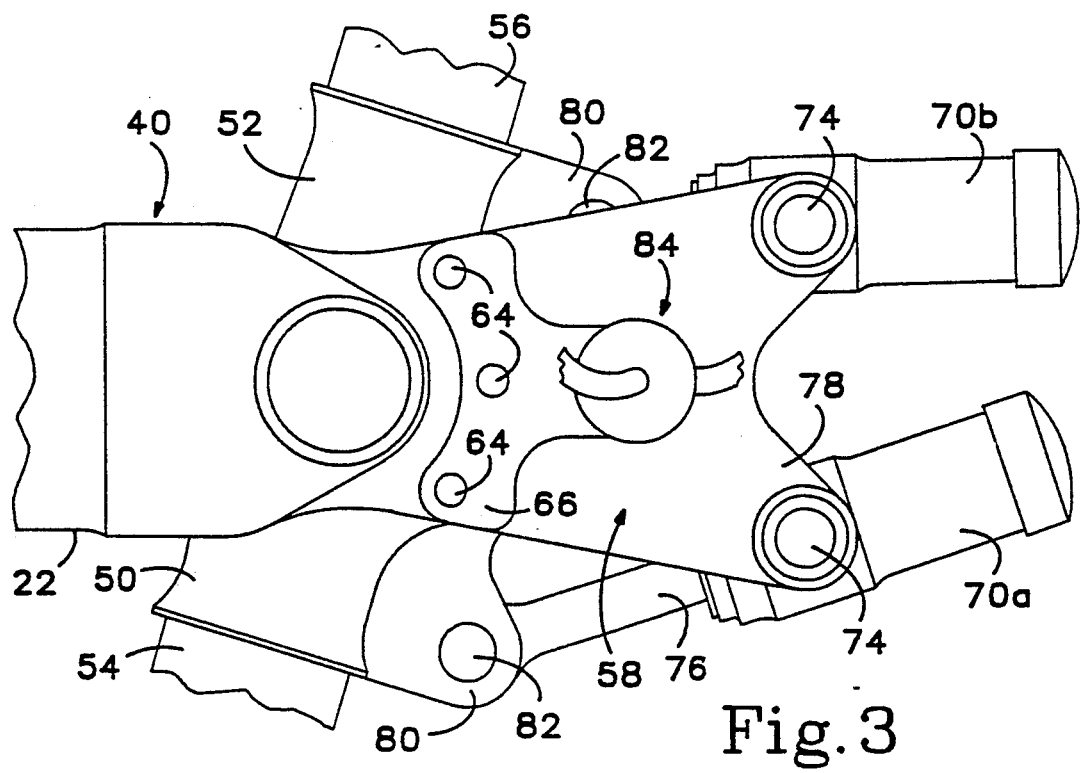
FIG. 3 is a similar plan view illustrating turning of a pair of landing gear wheels in a given direction.
Figure 4:
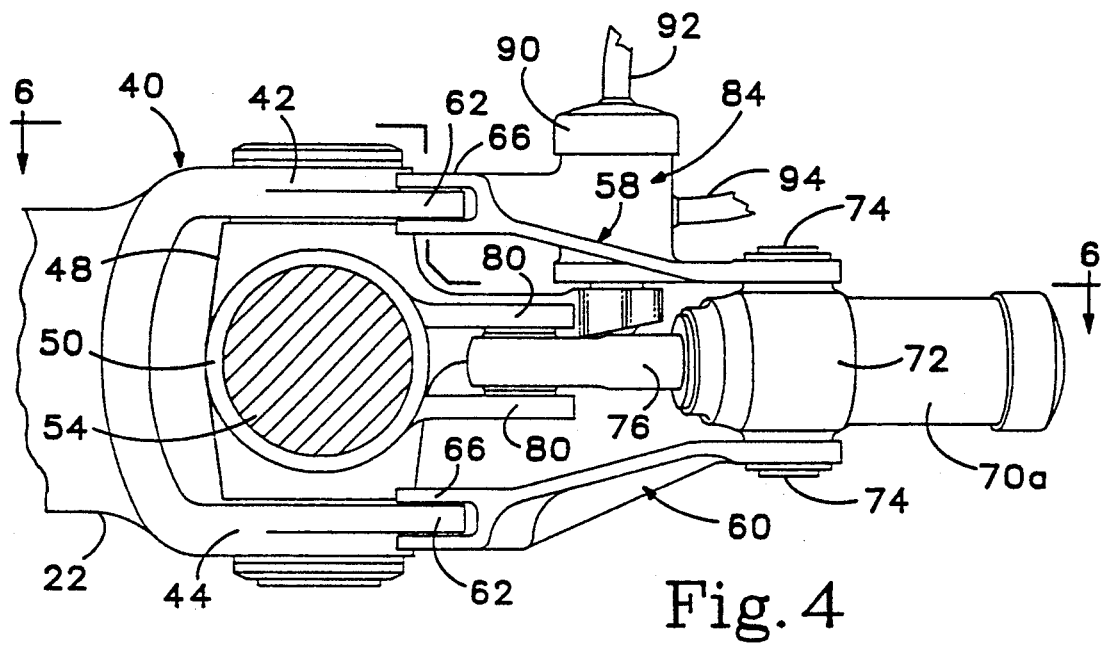
FIG. 4 is a partially broken away side view of the FIG. 2 mechanism.
Figure 5:
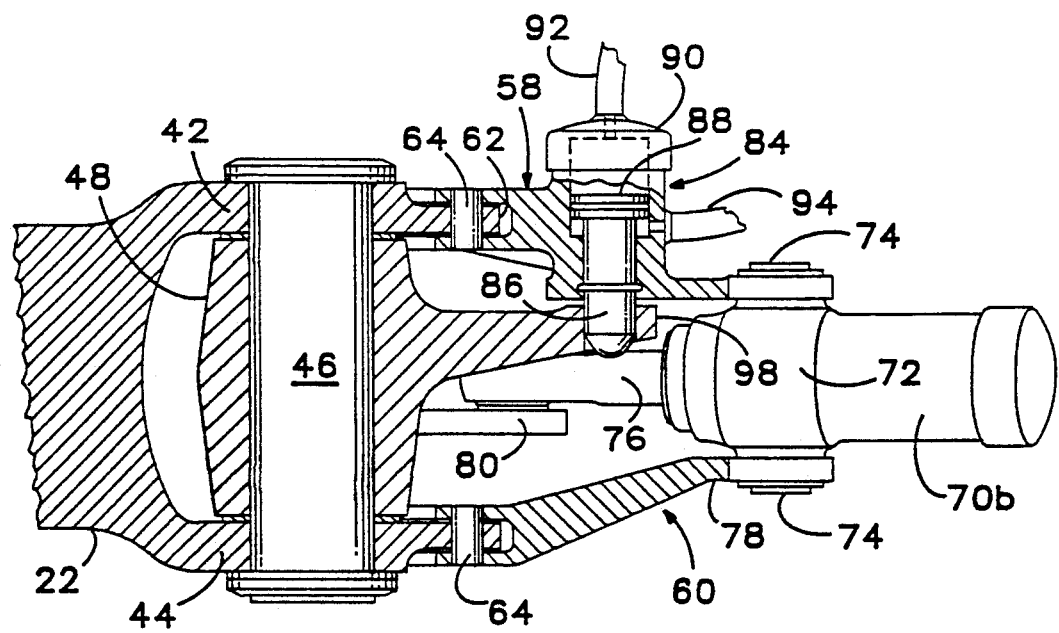
FIG. 5 is a vertical cross section of the FIG. 2 mechanism taken at 5—5 in FIG. 2.
Figure 6:
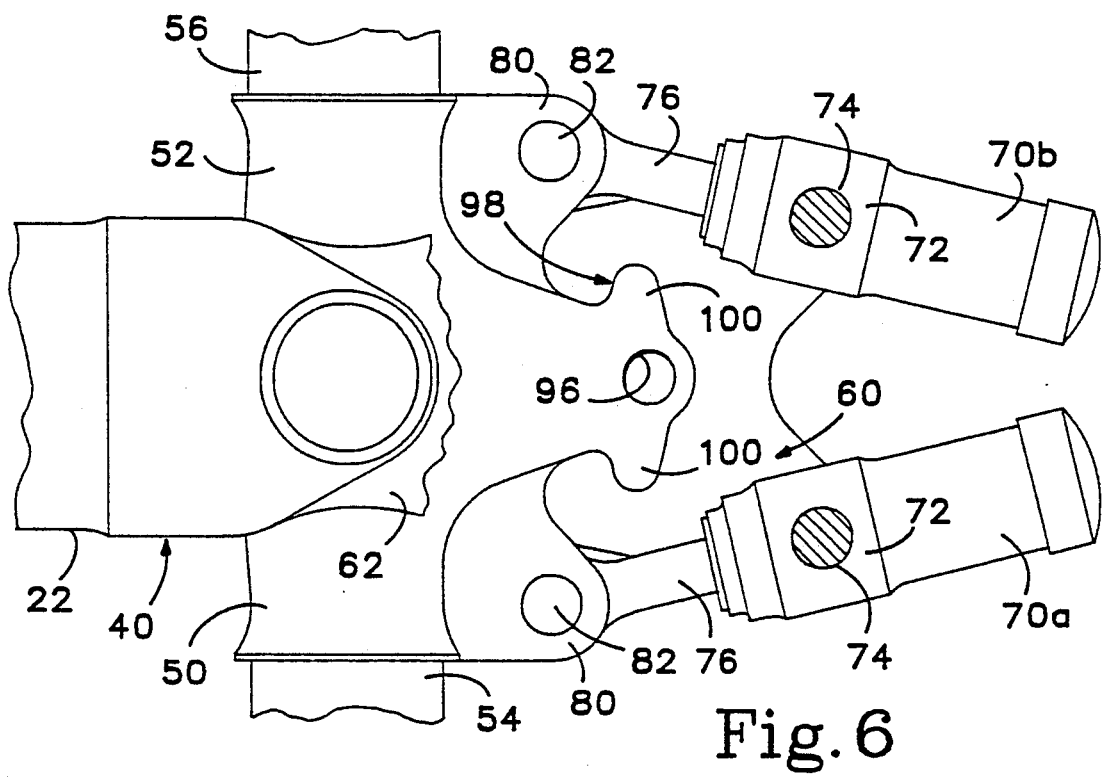
FIG. 6 is a partial cross sectional view of the steering mechanism as taken at 6—6 in FIG. 4.

Extending rearwardly from fork 40 is a yoke comprising an upper plate 58 and a lower plate 60 supported by fork extensions 62 via fastener pins 64 which engage a bifurcated section 66 on each of the yoke plates. At the remote end of the yoke, farther from the end of beam 22, a pair of hydraulic actuators 70 are pivotally engaged between rearward extensions 78 of upper plate 58 and lower plate 60, the hydraulic actuators being positioned to either side of the center line of the beam. Each of the actuators comprises a hydraulic cylinder provided with actuating or connecting rods 76 as well as a collar portion 72 having upper and lower stub shafts 74 rotatably received within bearing means on the yoke plate extensions. Connecting rods 76 are apertured at their remote ends to receive wrist pins 82 providing journals for the connecting rods and further received between ears 80 forming a clevis portion at the rear of the hub 48. One such clevis portion is located on each side of the center line of beam 22 to receive the wrist pins. Ears 80 are integral with the hub as well as with arms 50 and 52 on either side thereof and are disposed in substantially horizontal planes. As actuators 70 are operated, so as to extend or retract their respective connecting rods, ears 80 are urged forwardly or rearwardly providing leverage for causing the hub 48 to rotate about vertical shaft 46. Since the wheels of the rearward pair are carried by axle members 54 and 56, such pair of wheels will be rotated as a unit about the axis of shaft 46. Each of the actuators 70 pivots with respect to yoke 58, 60 during the course of extending or retracting a connecting rod. The actuators 70 are coordinated in their operation such that when one actuator is operated to translate its connecting rod outwardly, the remaining actuator is operated to retract its rod for correctly positioning hub 48 and therefore the wheels being steered. As hereinbefore mentioned, the pair of wheels being steered is turned in coordination with the turning of nose wheel landing gear 12 in FIG. 1. FIG. 3 shows the turned mechanism.

Also extending rearwardly from hub 48 and arms 50 and 52, at a location between and slightly above ears 80, is an apertured plate or tongue 98 which tapers inwardly toward the center line of the device but which has a slightly upraised and wider top surface 100 toward the rear including extensions at either side of central aperture 96. (See FIG. 6.) A plunger cylinder 84, the body of which is substantially integral with upper plate 58 of the yoke, is located thereabove. The plunger cylinder operates a plunger 86 (FIG. 5) adapted to be received within aforementioned aperture 96 for locking the steerable set of wheels in a straight ahead attitude.

The upper end of plunger 86 is attached to piston 88 received within the plunger cylinder, wherein a first hydraulic line 92 is coupled to the upper portion of the cylinder via cap 90, and a second hydraulic line 94 is coupled to the lower part of the cylinder beneath piston 88.

When it is desired to turn the designated pair of wheels by means of hydraulic actuators 70, plunger cylinder 84 is operated via lines 92 and 94 whereby hydraulic fluid is pumped in through line 94 and withdrawn via line 92 causing plunger 86 to upraise. When the set of wheels is thus turned substantially away from central position, dropping of plunger 86 will not lock the turning mechanism until steering is accomplished for returning the set of wheels to the straight ahead attitude, at which time the plunger 86 can drop into aperture 96. The bottom extremity of the plunger rides along widened portion 100 of tongue 98 for preventing unintended locking or disablement of the mechanism until the plunger and aperture are in alignment.

The herein described mounting system for the steerable pair of wheels facilitates rotation, while exhibiting sufficient structural strength, by means of fork 40 and shaft 46, for supporting the beam from the steerable wheels. The steering mechanism comprising actuators 70 is located longitudinally outboard from the beam 22 where it can provide sufficient leverage at spaced-apart wrist pins 82 for turning the set of wheels, while also being readily accessible for adjustment or repair.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. In a landing gear system for large aircraft provided with a steerable nose wheel landing gear and a main landing gear including plural trucks mounted on retractable struts positioned rearwardly of said nose wheel landing gear, at least one of said trucks comprising:

an elongated retractable beam extending in a direction longitudinal of said aircraft and positionable in substantial supporting relation to said aircraft below the body of said aircraft on one of said struts, said beam being provided with a plurality of support wheels mounted on said beam including a first pair coaxial with one another and located forwardly on said beam and a second pair coaxial with one another and located rearwardly on said beam, wherein said beam is provided with means for mounting at least one pair of said wheels for rotation with respect to said beam as a unit about a vertical axis fixed with respect to said beam, and means for steering the last mentioned pair of wheels with respect to said beam about said vertical axis in coordination with the steering of said nose landing gear for reducing tire scrubbing of the wheels of said main landing gear.

2. In a landing gear system for large aircraft provided with a steerable nose wheel landing gear and a main landing gear including plural trucks mounted on retractable struts positioned rearwardly of said nose wheel landing gear, at least one of said trucks comprising:

an elongated retractable beam extending in a direction longitudinal of said aircraft and positionable below the body of said aircraft on one of said struts, said beam being non-rotatable about the axis of its mounting strut and provided with a plurality of support wheels mounted on said beam including a first pair coaxial with one another and located forwardly on said beam and a second pair coaxial with one another and located rearwardly on said beam, wherein said beam is provided with means for mounting at least one pair of said wheels for rotation as a unit about a vertical axis fixed with respect to said beam, and means for steering the last mentioned pair of wheels with respect to said beam about said vertical axis in coordination with the steering of said nose landing gear for reducing tire scrubbing of the wheels of said main landing gear.

3. A landing gear truck according to claim 1 wherein remaining wheels on said truck other than the last mentioned wheels are steerably fixed wit respect to said beam and have transverse axes substantially perpendicular to the longitudinal direction of said beam.

4. A landing gear truck according to claim 3 wherein the last mentioned pair of wheels is turned for steering in response to steering of said nose landing gear so that the turning radius of the last mentioned pair of wheels intersects at a given turning point with the turning radius of said nose landing gear and the combined turning radius for said remaining wheels.

5. A landing gear truck according to claim 1 wherein the last mentioned pair of wheels comprises the rearwardly located wheels and is steered in a direction opposite to that of said nose landing gear.

6. A landing gear truck according to claim 1 wherein the last mentioned pair of wheels comprises the forwardly located wheels and is steered in the same direction as said nose landing gear.

7. A landing gear truck according to claim 1 wherein the first pair of wheels is positioned forwardly of the supporting strut of said truck and the second pair of wheels is positioned rearwardly of said supporting strut.

8. A landing gear truck according to claim 1 wherein said plurality of wheels further includes a central pair of wheels coaxial with one another and mounted on said beam between said first pair and said second pair.

9. A landing gear truck according to claim 1 wherein the last mentioned pair of wheels is mounted for rotation as a unit about a vertical axis defined by a bearing member on said beam.

10. A landing gear truck according to claim 1 further including means for selectively locking the last mentioned pair of wheels against rotation and in a direction tracking the longitudinal direction of said aircraft.

11. In a landing gear system for large aircraft provided with a steerable nose wheel landing gear and a main landing gear including plural trucks mounted on retractable struts positioned rearwardly of said nose wheel landing gear, at least one of said trucks comprising:

an elongated retractable beam extending in a direction longitudinal of said aircraft and positionable below the body of said aircraft on one of said struts, said beam being provided with a plurality of support wheels mounted on said beam including a first pair coaxial with one another and located forwardly on said beam and a second pair coaxial with one another and located rearwardly on said beam, wherein said beam is provided with means for mounting at least one pair of said wheels for rotation as a unit about a vertical axis fixed with respect to said beam, said mounting means for the last mentioned pair of wheels comprising a forked portion at one end of said beam including an upper member and a lower member supporting a vertical post therebetween defining said vertical axis, and a hub rotatable about said vertical post for carrying the last mentioned pair of wheels in coaxial relation with one another on either side of said hub, and means for steering the last mentioned pair of wheels with respect to said beam about said vertical axis in coordination with the steering of said nose landing gear for reducing tire scrubbing of the wheels of said main landing gear, said means for steering comprising a pair of hydraulic actuators attached to said forked portion and having a driving relation with respect to said hub for exerting a turning moment on said hub.

12. A landing gear truck according to claim 11 wherein the last mentioned pair of wheels comprises said second pair of wheels positioned substantially at the rearward end of said beam, and wherein said plurality of wheels further includes a central pair of wheels coaxial with one another and mounted on said beam between said first pair and said second pair, said central pair of wheels being steerably fixed with respect to said beam.

13. In a landing gear system for large aircraft provided with a steerable nose wheel landing gear and a main landing gear including plural trucks mounted on retractable struts positioned rearwardly of said nose wheel landing gear, at least one of said trucks comprising:

an elongated retractable beam extending in a direction longitudinal of said aircraft and positionable below the body of said aircraft on a said strut, said beam being provided with a plurality of support wheels mounted on said beam including a first pair coaxial with one another and located forwardly on said beam and a second pair coaxial with one another and located rearwardly on said beam, wherein said beam is provided with means for mounting at least one pair of said wheels for rotation as a unit about a vertical axis fixed with respect to said beam, said mounting means for the last mentioned pair of wheels comprising a forked portion at one end of said beam including an upper member and a lower member supporting a vertical post therebetween defining said vertical axis, and a hub rotatable about said vertical post for carrying the last mentioned pair of wheels in coaxial relation with one another on either side of said hub, and means for steering the last mentioned pair of wheels with respect to said beam about said vertical axis in coordination with the steering of said nose landing gear for reducing tire scrubbing of the wheels of said main landing gear, said means for steering comprising a pair of hydraulic actuators attached to said forked portion and having a driving relation with respect to said hub for exerting a turning moment on said hub, and including a yoke attached to said upper and lower members and extending longitudinally outward from the end of said beam for pivotally engaging cylinders of said hydraulic actuators at positions spaced from the end of said beam, said actuators having piston rods disposed to provide said driving relation to said hub, said rods driving said hub at either side thereof.

14. A landing gear truck according to claim 13 further provided with locking means comprising the combination of a vertically operable plunger and an apertured plate adapted for selectively receiving said plunger, wherein one of the members of said combination is substantially unitary with said hub extending longitudinally from the end of said beam and the other member of said combination is substantially unitary with said yoke.

* * * * *

UNITED STATES PATENT AND TRADEMARK OFFICE
CERTIFICATE OF CORRECTION

PATENT NO. : 5,242,131

DATED : September 7, 1993

INVENTOR(S) : John Watts

It is certified that error appears in the above-identified patent and that said Letters Patent is hereby corrected as shown below:

Column 7, line 22, "wit" should be --with--.

Column 8, line 68, "outward" should be --outboard--.

Signed and Sealed this

Twelfth Day of July, 1994

Attest:

BRUCE LEHMAN

Attesting Officer

Commissioner of Patents and Trademarks